G. A. BROWN.
Hay Tedder.
No. 12,269.
Patented Jan. 23, 1855.
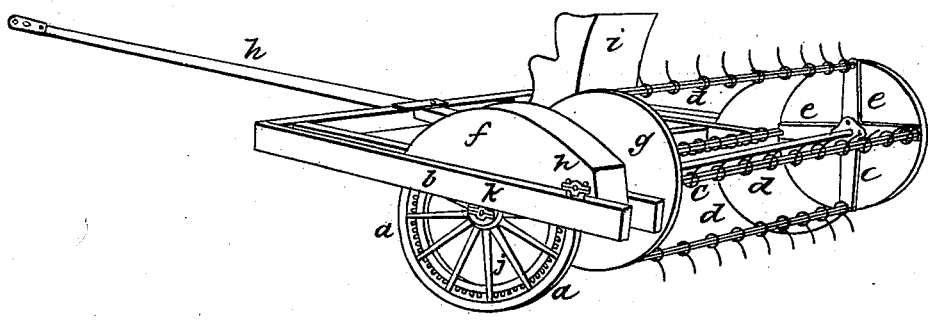
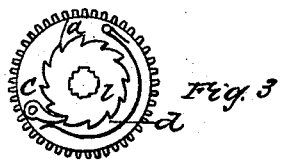
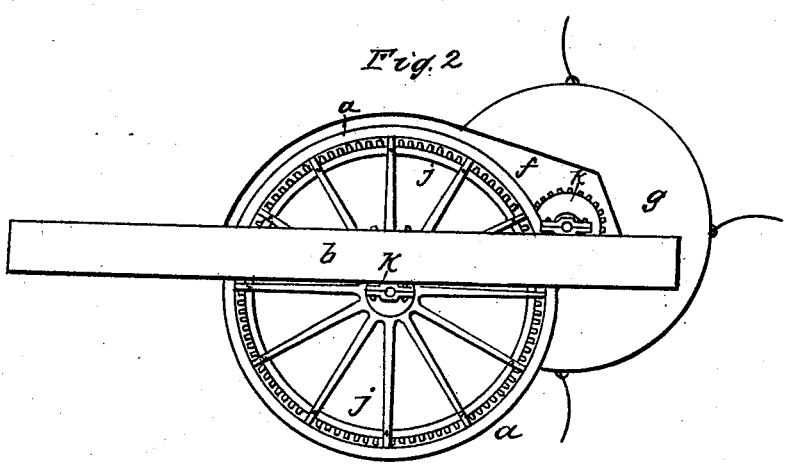
Witnesses
W. H. Crawton
Wm. D. Lake
Inventor
George A Brown

UNITED STATES PATENT OFFICE.

GEORGE A. BROWN, OF MIDDLETOWN, RHODE ISLAND.

HAY-MAKING MACHINE.

Specification forming part of Letters Patent No. 12,269, dated January 23, 1855.

*To all whom it may concern:*

Be it known that I, GEORGE A. BROWN, of Middletown, in the county of Newport and State of Rhode Island, have invented a new and useful machine called the "Spring-Tooth Hay-Maker;" and I do hereby declare that the following is a full, clear, and exact description of the construction and operation of the same, reference being had to the annexed drawings, making a part of this specification, in which—

Figure 1 is a perspective view; Fig. 2, a view of the left side of the machine, the side of the wheel-house being removed; Fig. 3, a view of the pinion or small wheel, and Fig. 4 a view of a finger or tooth.

At Figs. 1 and 2, *a* represents the driving-wheels; *b*, parts of the frame; *c*, main shaft; *d*, finger-bars; *e*, arms to support finger-bars; *f*, wheel-house; *g*, cap covering the ends of the picker; *h*, pole; *i*, driver's seat; *j*, rim of cog-wheel bolted to the driving-wheel; *k*, boxes for the bearings of the main shaft and axles of the driving-wheels.

At Fig. 3, *a* represents the outer part of the pinion; *b*, ratchet-wheel; *c*, dog or latch; *d*, spring.

To enable others skilled in the art to make and use my invention, I will proceed to describe its construction and operation.

I make the driving-wheels either like ordinary team-wagon wheels, about three and a half feet in diameter, the hubs eight inches long, or of plank two inches thick, with battens on each side one inch thick, and a cast-iron washer on each side eight inches in diameter and half an inch thick, bolted through the whole. I then bolt a rim of a spur-gear wheel of cast-iron, about three feet in diameter, to each driving-wheel. I construct the frame of good hard joists two inches thick and seven inches deep, the sides about seven feet long, and the front about eight or ten feet long. I use two joists for each side, placing them eight inches apart in the clear to allow the driving-wheels to run between them. I also use two joists for the front of the frame, set twenty inches apart, and cover them in part with a board, on which is placed the driver's seat. I also secure the pole to these joists in such manner as that it may be raised or lowered at pleasure to regulate the height of the fingers from the ground. I leave the rear of the frame open, except two short pieces to join the parts of the sides. For the main shaft I use a bar of iron one and one-fourth inch square and as long as the machine is wide, which I place on the top of the frame, near the rear end, with bearings turned and set in boxes at each place it crosses the parts of the frame. On this shaft I make the picker in form of a reel with four bars for the fingers, its diameter being three feet, its length equal the distance between the inner side pieces of the frame. The finger-bars are about two inches in diameter. The fingers are made of iron or steel wire about three-eighths of an inch in diameter. They are driven through the bars from the inside and secured by a nut on the outside, then bent one and a half time around the bar, about three-fourths of an inch from it, and terminate on the outside, about nine inches from the bar, with a slight bend forward, as seen at Fig. 4 in the accompanying drawings. I cover the ends of the picker with a thin circular board, and place a similar one of a little larger diameter on the frame, with a hoop around it, thus making a cap like a box-cover, in which the ends of the picker turn. I also cover the wheels and gear with light wheel-houses, which prevent the hay from getting into the bearings. The axles of the driving-wheels are each one foot long, with bearings turned on each end, the boxes for which are bolted to the bottom edges of the frame forward of the main shaft. I place a pinion or small wheel, which has one-fourth as many teeth as the driving-gear has, on each end of the main shaft in the space between the side pieces of the frame, so as to match the gear on the driving-wheels. The outer part of the pinion has a round hole in the center two and a half inches in diameter, in which a bushing is inserted, which is keyed tight on the shaft, and has a flange on the one side half an inch wide. A ratchet-wheel five and a half inches in diameter is keyed tight to the shaft and bushing on the other side. A dog and spring are attached to the outer part, by means of which the whole is made to revolve together. This arrangement is necessary in turning about when only one wheel turns. It is convenient also in going from field to field, as the dog may be raised above the spring, and thus let the outer part of the pinion turn loose on the bushing and not turn the picker. I put the fingers about ten and a half inches apart in the finger-bars, and in such order that the fingers in each bar pass in the space between where those in the next bar do. The height of the fingers should be from two to three inches on level ground, which is gaged by the pole or thills. I have oil-cups on all the boxes, which are to be filled with cotton and kept well oiled when in use. In working a large machine I use a pair of horses or oxen, as is most convenient, and in working a small one I use one horse, commencing at the leeward side of the field and going side to the wind, when it can well be done. The picker revolves four times while the driving-wheels revolve once, and in the opposite direction, so that the hay is taken up and thrown high in the air and left to fall lightly on the stubble.

What I claim as my invention, and desire to secure by Letters Patent, is—

The construction of a machine in manner and form as herein described, or in any other manner or form substantially the same, applying the power directly from the driving-wheels to the spreading apparatus, thus saving the loss of power caused by friction in a series of wheels using coiled or spring teeth, and the application of such machine to the purpose of spreading and turning hay.

In witness whereof I have hereunto subscribed my name this 12th day of December, in the year of our Lord 1854.

GEORGE A. BROWN. [L. S.]

In presence of—
G. B. REYNOLDS,
DANIEL C. DENHAM.